June 13, 1961  F. H. MANN  2,988,692
APPARATUS FOR EXPLORING BOREHOLES
Filed Sept. 12, 1956  2 Sheets-Sheet 1

INVENTOR.
FREDERICK HENRY MANN
BY Robert Hochfield
HIS ATTORNEY

United States Patent Office 2,988,692
Patented June 13, 1961

2,988,692
APPARATUS FOR EXPLORING BOREHOLES
Frederick Henry Mann, Calgary, Alberta, Canada, assignor, by mesne assignments, to Schlumberger Well Surveying Corporation, Houston, Tex., a corporation of Texas
Filed Sept. 12, 1956, Ser. No. 609,377
Claims priority, application Great Britain Sept. 27, 1955
4 Claims. (Cl. 324—10)

This invention relates to apparatus for exploring boreholes and, more particularly, pertains to new and improved apparatus for determining the angle of dip and the azimuth of dip of geological strata penetrated by a borehole.

Generally stated, the determination of the dip of earth strata has been determined heretofore by obtaining the orientation of the geological formations with respect to an instrument in the hole and finding the orientation of the instrument with respect to the vertical and to the north direction. This has been accomplished, for example, by providing the borehole instrument with bowed springs for pressing three small electrode systems against the face of the borehole, the electrodes lying in a plane perpendicular to the axis of the instrument and evenly spaced around it. Inside the instrument are a magnetic compass, a concave member carrying a rolling ball, and photographic apparatus. As the instrument is pulled up the hole, three resistivity or spontaneous potential logs are recorded at the surface of the earth, and the relative displacement of the three curves required to bring them into longitudinal juxtaposition is a measure of the dip of the formations relative to the instrument. A series of photographs of the compass and the ball-carrying concave member taken at successive levels in the borehole establish the orientation of the instrument with respect to vertical and to magnetic north during its travel. The accuracy of dip determinations made with apparatus of this type is relatively good and a large measure of commercial success has been realized.

It is an object of the present invention to provide new and improved apparatus for exploring a borehole to determine the angle and azimuthal direction of the dip of earth strata traversed by the borehole.

Another object of the present invention is to provide a new and improved dipmeter which is capable of giving accurate results and not requiring electrodes pressed against the sidewall of the borehole.

According to the present invention, apparatus for exploring boreholes to determine the angle and direction of dip of geological strata penetrated by a borehole comprises an electrode assembly adapted to be moved through the borehole, the electrode assembly including an elongated electrode and relatively small electrodes insulated from the elongated electrode and spaced from one another around a longitudinal axis of the elongated electrode. The elongated and small electrodes are maintained at substantially the same potential, and means are provided for obtaining indications responsive to the current flowing from each of the small electrodes. The apparatus may also include means for determining the azimuthal and vertical orientation of the electrode assembly when the assembly is in a borehole.

By having at least three small or beamed current electrodes spaced around the surface of an elongated or potential guard electrode, it is possible, in the use of the electrode assembly for logging a borehole, to obtain resistivity logs along at least three profiles of the borehole by measuring the resistance to the currents leaving the beamed current electrodes when they are supplied with current. The beamed current electrodes constitute relatively small electrically isolated portions of the relatively large conducting surface forming the potential guard electrode and, when the potential guard and beamed current electrodes are maintained at the same or substantially the same potential, the effect of the large conducting area surrounding or guarding the beamed current electrodes causes a well focused "beam" to be emitted by each of the beamed current electrodes. Accordingly, the potential guard and beamed current electrodes are so called.

The novel features of the present invention are set forth with particularity in the appended claims. The present invention, both as to its organization and manner of operation, together with further objects and advantages thereof, may best be understood by reference to the following description taken in connection with the accompanying drawings in which:

Figure 1:
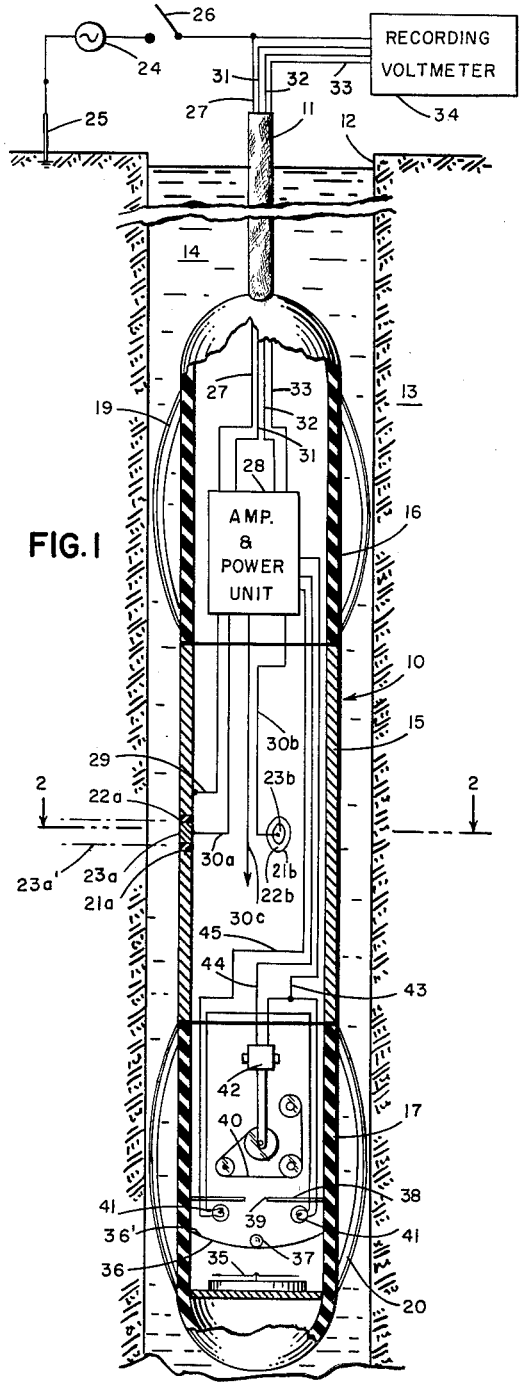
FIG. 1 is a view in longitudinal cross-section of borehole apparatus constructed in accordance with the present invention and shown in operative position within a borehole.

In FIG. 1 of the drawings, apparatus constructed in accordance with the present invention is shown to comprise a housing or carrier 10 suspended by an armored electrical cable 11 in a borehole 12. Borehole 12 penetrates earth formations or geological strata 13 and is filled with an electrically conductive liquid 14, usually in the form of a drilling mud.

Housing 10 is comprised of a hollow, cylindrical, elongated section 15 constructed of an electrically conductive material. Section 15 will be referred to hereinafter as a potential guard electrode and a determination of its physical dimensions is presented in a discussion to follow. Extending from central section 15 are upper and lower sections 16 and 17 of like diameter suitably sealed to the central section, thereby to form a pressure-tight enclosure. Sections 16 and 17 are constructed of an electrically insulating material or may be formed of conductive sleeves provided with an electrically insulating coating on the outer surfaces thereof. Each of the upper and lower sections is provided with a respective set of bowed springs 19 and 20 which press against the sidewall of borehole 12, thereby to maintain the housing 10 axially aligned within the borehole.

Figure 2:
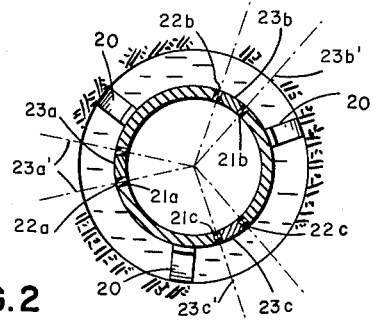
FIG. 2 is a cross-sectional view taken along lines 2—2 of FIG. 1.

Located in a plane perpendicular to the axis of cylindrical section 15 are three cylindrical openings 21a, 21b and 21c, the latter of which may be seen in FIG. 2, spaced equidistantly around the cylinder. Each of the openings receives a respective one of tightly fitting cylindrical sleeves 22a, 22b and 22c, of electrically insulating material, and each of the insulating sleeves receives a tightly fitting one of electrically conductive discs 23a, 23b and 23c, hereafter referred to as beamed current electrodes. The sleeves are appropriately sealed to their respective openings and beamed current electrodes, thereby to maintain the fluid integrity of housing 10.

Since the openings 21a, 21b and 21c are evenly spaced about the cylinder 15, the electrodes 23a, 23b and 23c are spaced at 120° intervals in the aforementioned horizontal plane. The beam current electrodes should be relatively small compared with the size of the exterior surface area of the potential guard electrode. The discussion of their physical size will be presented hereinafter.

To energize the electrode system just described, a source of alternating potential 24 at the surface of the earth has one of its output terminals grounded a point 25 and supplies a constant current via an operating switch 26 and an electrically insulated conductor 27 of cable 11 to an amplifier and power unit 28 within housing 10. Unit 28 will be described in detail hereinafter and provides constant current via a connection 29 to potential guard electrode 15. Connections 30a, 30b and 30c, coupled to conductor 29 via respective low impedances (not shown), extend from unit 28 to the beamed current electrodes 23a, 23b and 23c, respectively, to maintain them at substantially the same potential as the potential guard electrode. Unit 28 derives three unidirectional potentials, responsive to the currents flowing from the beamed current electrodes, and these are individually supplied over electrically insulated conductors 31, 32 and 33 of cable 11 to a conventional recording voltmeter unit 34 located at the surface of the earth. Voltmeter 34 is also connected to conductor 27 and preferably records the three potentials on three tracks of a common record sheet which is displaced in proportion to movement of housing 10 through the borehole 12 in a known manner.

To determine the azimuthal and vertical orientation of housing 10, any known inclinometer arrangement may be employed. For example, a magnetic compass 35 may be pivotally supported within lower housing section 17 below a concave member 36 of transparent material carrying an opaque, rolling ball 37. A baffle 38 positioned above member 36 is provided with an appropriate aperture 39 whereby a photographic image of compass 35, ball 37 and a reference indicium 36' on concave member 36 may be obtained on a photo-sensitive film 40 supported for movement past aperture 39. Light sources 41 mounted below baffle 38 for illuminating the compass 35, indicium 36' and ball 37 and a driving motor 42 for moving the film 40 are connected by leads 43, 44 and 45 to unit 28, which, as will be later described in detail, selectively energizes the lights 41 and the motor 42 in response to predetermined manipulation of switch 26.

It will be observed that the spread of the current beam in the horizontal plane when the assembly is suspended in a borehole is primarily determined by the angles subtended at the axis of the potential guard electrode 15 by the beamed current electrodes 23a, 23b and 23c (assuming radial symmetry). On the other hand, its spread in the vertical direction depends not only on the length and shape of the potential guard electrode but also on the relative resistivities of the media encountered by the focused beams.

It is obviously desirable that a current beam should have a very small cross-sectional area where it strikes the borehole wall and that this area should be as large as possible everywhere else. Such a shape assures that most of the resistance offered to the current beam occurs at the borehole wall. However, the shape of the current beam as it passes through the drilling fluid present in the borehole during logging is not very important, as long as it is comparatively unaffected by formation variations, since the resistance of this part of the current path should be fairly constant and, with most drilling fluids, will be fairly low. It is important, though, that the "penetration" of the current beam into the formation should be small, i.e., that the beam should diverge rapidly once it passes out of the borehole. In the vertical plane this effect can be reached by suitable choice of dimensions of the electrode system. Preferably the diameter of the potential guard electrode should be about ¼ to ½ that of the borehole and the overall length about ½ to five times the borehole diameter for the configuration of a circular cylindrical guard electrode at uniform potential.

The size and shape of a beamed current electrode will be the principal factors determining the cross-section of the current beam where it strikes the borehole wall and hence will determine the resolution of the logging system. The interfacial plane between two rock formations is very rarely less than $\frac{1}{16}$ inch thick, either due to a short transition from one rock type to another or to irregularities in the surface formed by the interface. Hence, $\frac{1}{16}$ inch is the thickness which it is desirable to detect and this should be possible with a beam which is not more than ten times this thickness in the vertical plane. Where the beam is focused so that it no more than doubles its thickness between the beam electrode and the borehole wall, the beam electrode should, therefore, be about 0.3 inch from top to bottom. Preferably, a circular beamed current electrode is inserted in the potential guard electrode body and a maximum size of 0.3 inch in the horizontal plane provides a sufficiently narrow beam.

In operation, housing 10 is drawn through borehole 12 with switch 26 closed and since the potential guard and beamed current electrodes are maintained at the same potential currents flow from electrodes 23a, 23b and 23c in the from of three well-focused beams represented in broken outline 23a', 23b' and 23c' in FIGS. 1 and 2. The magnitude of the currents leaving the beamed current electrodes depends upon the resistivity of the geological strata 13 and since the potentials supplied to recording voltmeter 34 via leads 31, 32 and 33 are dependent upon these currents, three electrical resistivity curves are recorded simultaneously. By virtue of the use of focused beams, these records provide highly localized indications of variations in resistivity in three zones equidistantly spaced about the longitudinal axis of housing 10. Since both horizontal and vertical focusing is achieved in each beam, i.e., there is little or no spreading of the beam until after it enters the wall of the borehole, each record accurately depicts changes in resistivity, although they may be small, between successive strata. Accordingly, the longitudinal separation of the three curves very accurately represents the dip of the strata relative to housing 10.

Periodically, switch 26 is operated first to energize motor 42 to bring an unexposed portion of film 40 opposite aperture 39 and then to energize lights 41 whereby a photographic exposure of the positions of compass needle 35 and ball 37 relative to a reference indicia 36' is made on film 40. The switch is then operated to deenergize the lights and is then closed so that recording of the three resistivity curves may be continued. Thus, the azimuthal and vertical orientation of housing 10 is obtained at a series of levels in the borehole.

After the housing is taken out of borehole 12, film 40 may be removed and then processed in a known manner to fix the images thereon. The information provided by recording voltmeter 34 and film record 40 may then be employed in order to determine the angle and azimuthal direction of the dip of the geological strata penetrated by the borehole 12 in a known manner.

Figure 3:
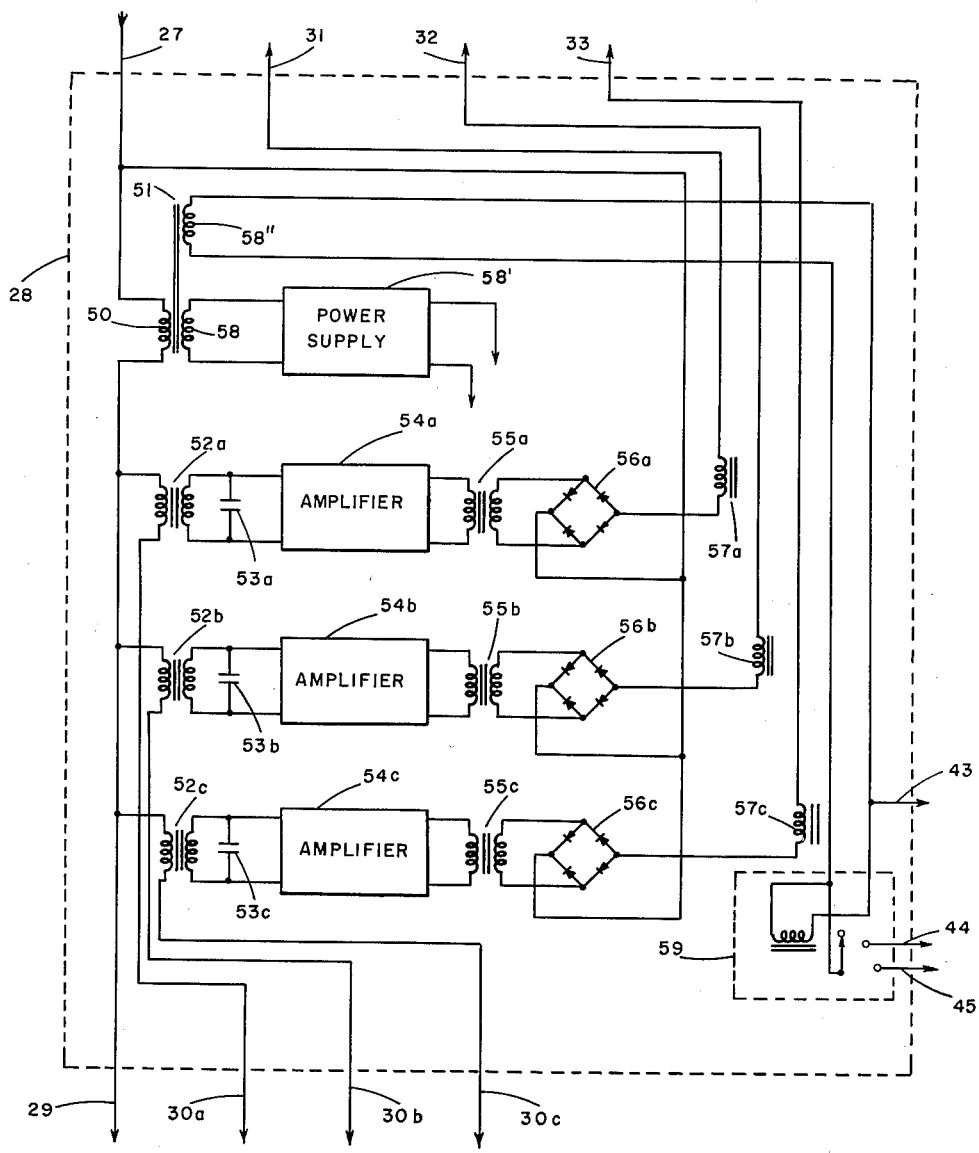
FIG. 3 is a schematic circuit diagram, partly in block form, of an amplifier and power unit suitable for use in the apparatus of FIG. 1.

In FIG. 3 a schematic circuit diagram of amplifier and power unit 28 is illustrated. It will be observed that conductor 27 is connected through primary winding 50 of a power transformer 51 (whose function will be described hereinafter) to the lead 29 that extends to potential guard electrode 15. The leads 30a, 30b, and 30c are connected to lead 29 through primary windings of respective coupling transformers 52a, 52b and 52c. The impedance of each of these primary windings is very low compared to the impedance to earth strata 13 of the beamed current electrodes 23a, 23b and 23c so that there is a negligible potential drop across these windings and the potentials of the potential guard and beamed current electrodes remain substantially equal.

The secondary windings of transformers 52a, 52b and 52c are tuned by means of respective condensers 53a, 53b and 53c to the frequency of the source 24. Each secondary winding is coupled to a respective one of amplifiers 54a, 54b and 54c whose outputs are applied via transformers 55a, 55b and 55c to individual rectifiers 56a, 56b and 56c. One output terminal of each rectifier is connected to lead 27 and the remaining output terminals of the rectifiers are connected by low frequency filter chokes 57a, 57b and 57c to conductors 31, 32 and 33, respectively.

The rectified signals from these rectifiers are obtained by the chokes 57a, 57b and 57c in conjunction with capacity between the conductors of cable 11. However, if additional capacitance is required, it may be appropriately inserted in circuit with each choke in a known manner.

One secondary winding 58 of power transformer 51 is coupled to a conventional power supply 58' used to energize amplifiers 54a, 54b and 54c. Another secondary 58" is coupled to a stepping relay 59 of conventional construction which may be used to connect secondary 58" to leads 43 and 44 and to leads 43 and 45, selectively.

It will be seen that when switch 26 is closed, alternating current flows through lead 27 to the potential guard electrode and through leads 30a, 30b and 30c to the beamed current electrodes. Variations in the currents flowing from the beamed current electrodes produce corresponding variations in the alternating potential derived at the secondaries of transformers 52a, 52b and 52c and these potentials are amplified before being applied to the respective rectifiers. Accordingly, unidirectional potentials are supplied over leads 31, 32 and 33 to the recorder 34. It will be noted that by opening and closing switch 26, stepping relay 59 is operated to supply energy to leads 43 and 44 and to leads 43 and 45 as required. If desired, an appropriate indicator may be provided at the surface of the earth for denoting the position of a movable contact within the stepping relay 59.

Figure 4:
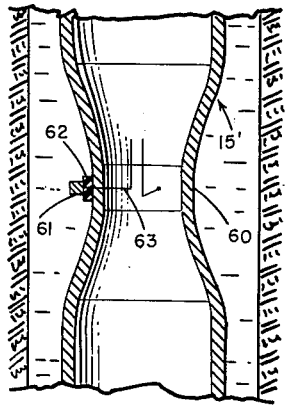
FIG. 4 is a view in longitudinal cross-section of apparatus similar to that shown in FIG. 1, but illustrating another embodiment of the invention.

Other configurations for the potential guard electrode may be employed. For example, as shown in FIG. 4, a modified electrode 15' may be employed which has, referring to a vertical cross-section, an "hour-glass waist," or section of reduced diameter 60. Three beamed current electrodes are centrally located at waist 60 and may be mounted to individual electrical insulators. For example, electrode 61 is appropriately attached to an essentially disc-shaped insulator 62 conformed to the shape of the adjacent surface of waist 60 and attached thereto. An electrically insulated conductor 63 extends from electrode 61 through appropriate sealed openings in insulator 62 and waist 60 into the interior of electrode 15'. Alternatively, the beamed current electrodes may be located in separate recesses in the potential guard electrode, being appropriately insulated therefrom. It is evident that the arrangement of FIG. 4 provides improved focusing in a vertical plane.

Figure 5:
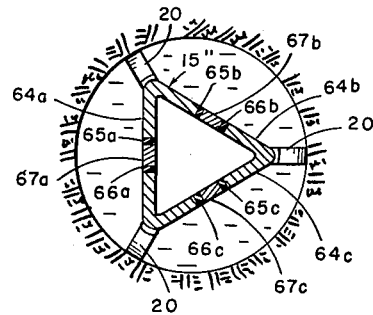
FIG. 5 is a view similar to the horizontal section represented in FIG. 2, but illustrating yet another embodiment of the invention.

In another embodiment of the invention represented in FIG. 5, a modified potential guard electrode 15" is of non-circular horizontal section. For example, as there represented, the electrode may be of generally triangular configuration in horizontal section. Each of the resulting flat vertical faces 64a, 64b and 64c is provided with one of central openings 65a, 65b and 65c located in a horizontal plane. As in the arrangement of FIGS. 1 and 2, each opening has a respective one of insulating sleeves 66a, 66b and 66c and the sleeves receive corresponding ones of beamed current electrodes 67a, 67b and 67c. It is evident that the arrangement of FIG. 5 provides improved focusing in a horizontal plane.

Of course, a further improvement in such focusing may be achieved by modifying faces 64a, 64b and 64c so that they are cylindrically concave inwardly relative to the longitudinal axis of electrode 15". Moreover, spherical concavities can be used for added focusing in both horizontal and vertical planes.

If desired, D.C. may be employed for the excitation of the electrode system instead of A.C. as illustrated, and the arrangement within circuit 28 may be modified appropriately.

As an alternative to the use of a low impedance for maintaining the potential between the potential guard and beamed current electrodes, these electrodes may be coupled to a suitable amplifier or servo system whose output is used to control the current fed to the potential guard electrode to maintain substantially zero potential between the potential guard and beamed current electrodes in a known manner.

Although a photographic type inclinometer has been illustrated in FIG. 1, obviously other types may be employed. For example, any of various conventional inclinometers providing electrical signals representative of azimuthal and vertical orientation of the housing 10 may be used. These signals can be supplied over additional conductors of cable 11 to the surface of the earth for recording. Alternatively, any of the usual multiplexing techniques may be utilized for conveying these, as well as other signals, over a minimum number of cable conductors.

While particular embodiments of the present invention have been shown and described, it is apparent that changes and modifications may be made without departing from this invention in its broader aspects, and, therefore, the aim in the appended claims is to cover all such changes and modifications as fall within the true spirit and scope of this invention.

I claim:

1. Electrode apparatus for investigating earth formations traversed by a borehole comprising: a guard electrode; means for centering the guard electrode in the borehole; the guard electrode having a shape such that, when centered in the borehole, a first surface portion thereof is at a predetermined distance from the borehole wall and a second surface portion is at a greater distance from the borehole wall; and a small electrode located on the second surface portion and electrically insulated from the guard electrode proper.

2. Electrode apparatus for investigating earth formations traversed by a borehole comprising: an electrode having a concave surface portion; means for positioning the trough of the concave surface portion at a lesser distance from the longitudinal center axis of the borehole than the remainder of the adjacent electrode surface; and a small electrode located in the trough of the concave surface portion and electrically insulated therefrom.

3. Electrode apparatus for investigating earth formations traversed by a borehole comprising: an elongated guard electrode having a concave surface portion located intermediate the ends thereof; and a small electrode located in the trough of the concave surface portion and electrically insulated therefrom.

4. Electrode apparatus for investigating earth formations traversed by a borehole comprising: an elongated generally cylindrical guard electrode of predetermined diameter having a surface portion of reduced diameter intermediate the ends thereof; and three small button electrodes located on the reduced diameter surface portion and spaced apart from one another around the circumference thereof and electrically insulated from the guard electrode proper.

References Cited in the file of this patent

UNITED STATES PATENTS

| | | |
|---|---|---|
| 2,199,367 | Athy | Apr. 30, 1940 |
| 2,347,794 | Piety | May 2, 1944 |
| 2,400,678 | Archie | May 21, 1946 |
| 2,427,950 | Doll | Sept. 23, 1947 |
| 2,446,303 | Owen | Aug. 3, 1948 |
| 2,592,125 | Doll | Apr. 8, 1952 |
| 2,633,485 | Patnode | Mar. 31, 1953 |
| 2,655,632 | Murphree | Oct. 13, 1953 |

FOREIGN PATENTS

| | | |
|---|---|---|
| 691,721 | Great Britain | May 20, 1953 |